United States Patent [19]

Dembicki et al.

[11] 4,324,601
[45] Apr. 13, 1982

[54] PREPARATION OF GLASS CONTAINER FOR THERMOPLASTIC CLOSURE

[75] Inventors: Michael T. Dembicki; William J. Poad, both of Brockport, Pa.

[73] Assignee: Brockway Glass Company, Inc., Brockway, Pa.

[21] Appl. No.: 233,056

[22] Filed: Feb. 10, 1981

Related U.S. Application Data

[63] Continuation-in-part of Ser. No. 86,398, Oct. 19, 1979, Pat. No. 4,260,438.

[51] Int. Cl.³ .................. B67B 3/00; B32B 17/10; C03C 15/00; C03C 21/00
[52] U.S. Cl. ...................... 156/69; 53/287; 53/478; 65/24; 65/111; 65/60.2; 65/117; 65/120; 65/30.1; 156/82; 156/322; 156/497; 156/629; 156/663; 215/232; 215/DIG. 2; 427/154; 427/224; 427/389.7; 428/410; 428/426; 428/427; 428/432; 413/5
[58] Field of Search .................. 53/287, 329, 478; 65/30 R, 32, 33, 111, 24, 60 A, 60 R, 117, 120; 113/1 D; 156/69, 153, 292, 322, 629, 635, 663, 82, 497; 215/232, DIG. 2, DIG. 6; 428/35, 195, 200, 420, 421, 426, 427, 432, 410; 427/154, 224, 314, 373, 387, 389.7

[56] References Cited

U.S. PATENT DOCUMENTS

| | | | |
|---|---|---|---|
| 2,539,159 | 1/1951 | Peiler | 65/120 X |
| 3,249,246 | 5/1966 | Mahoney | 65/33 X |
| 3,314,772 | 4/1967 | Poole et al. | 65/30 R |
| 3,420,693 | 1/1969 | Scholes et al. | 65/24 X |
| 3,460,310 | 8/1969 | Adcock et al. | 53/478 |
| 3,485,687 | 12/1969 | Chapman et al. | 156/663 X |
| 3,498,819 | 3/1970 | Lyle et al | 427/419.5 X |
| 3,501,042 | 3/1970 | Risch et al. | 215/232 |
| 3,653,864 | 4/1972 | Rothermen et al. | 156/663 X |
| 3,656,922 | 4/1972 | Budd | 65/119 X |
| 3,811,862 | 5/1974 | Yakubek et al. | 65/120 X |
| 3,819,346 | 6/1974 | Southwick et al. | 65/24 |
| 3,827,871 | 8/1974 | Budd | 427/422 X |
| 4,122,790 | 10/1978 | Rowe et al. | 113/120 R |

Primary Examiner—Edward C. Kimlin
Assistant Examiner—Robert A. Dawson
Attorney, Agent, or Firm—Christel, Bean & Linihan

[57] ABSTRACT

A method for preparing a glass container, and for sealing a glass mouth of a container and the seal are described. The sealing surface, or finish, of the container is subjected to a hot end treatment after forming and before annealing to enhance adhesion between the container finish and a thermoplastic membrane seal. The container is next annealed and after annealing is subjected to a cold end treatment in which the exterior container surface is coated with a material which enhances the lubricity and increases the abrasion and scratch resistance of the container. The container finish only is then subjected to a brief heat treatment sufficient to remove any lubricity enhancing material from the finish. A membrane comprising a thermoplastic film is pressed onto the container finish and heated causing glass-plastic adhesion and forming a closure.

14 Claims, 2 Drawing Figures

PREPARATION OF GLASS CONTAINER FOR THERMOPLASTIC CLOSURE

CROSS-REFERENCE TO RELATED APPLICATIONS

This application is a continuation-in-part of U.S. Patent Application Ser. No. 086,398 filed Oct. 19, 1979, now U.S. Pat. No. 4,260,438.

BACKGROUND OF THE INVENTION

This invention relates to the preparation of glass containers for thermoplastic membrane sealing. Heat activated membrane seals for plastic containers are common in the packaging and canning art. Generally a membrane, which may be a laminate of aluminum foil and a thermoplastic polymer, is pressed on the rim of a plastic container and heated to form polymer-polymer adhesive contact. The problem with this method when used with soda-lime-silica glass containers is that the failure of the seal will generally occur within a few days of sealing due to poor initial adhesion between the glass and the polymer or poor durability of the adhesion.

Substantially improved adhesion between a membrane seal and a container finish is obtained by subjecting the finish to a high temperature treatment which modifies the finish surface. This high temperature treatment preferably is conducted immediately after the containers are formed and comprises contacting the finish with a decomposible fluorine-containing compound, or a compound which decomposes to form a metal oxide, or a compound which decomposes to form a sulfur oxide, sulfur oxides and combinations of the above. These treating materials may be used in any order or simultaneously.

A sealing closure for the container is formed by pressing a membrane comprising a thermoplastic film onto the container finish and heating to form a glass/plastic adhesive bond. The membrane desirably may be an aluminum foil-thermoplastic film laminate. It may also be a polymer sheet, a laminate of polymer, a paper/polymer laminate or a laminate of one or more layers of polymers, metal foil, and paper.

This described technique provides a reliable and secure closure so long as the container finish remains uncontaminated. However, during cold end treatment of the containers after annealing, it was found that the treating material, typically a polymer, stearate or silicone, would occasionally be deposited on the container finish to the extent that erratic sealing results were obtained.

SUMMARY OF THE INVENTION

A glass container is first subjected to a hot end treatment in which the finish, or sealing surface, is modified so as to enhance its adhesion to a thermoplastic closure. The container is then annealed and the exterior surface of the container is coated with a lubricity enhancing material which increases the abrasion and scratch resistance of the glass. Contamination of the container finish by the lubricity enhancing material is removed by subjecting only the finish to a brief heat treatment at a temperature below which flame polishing, or surface melting, of the glass occurs. Thereafter, a closure seal is formed by pressing a membrane comprising a thermoplastic film over the container finish and heating to form a glass-plastic adhesive bond.

Hence, it is an object of this invention to provide a method for obtaining durable seals between a glass container and a thermoplastic membrane.

It is a further object of this invention to treat the finish of a glass container so as to obtain a dependable and durable seal with a thermoplastic material.

A specific object of this invention is to remove contaminating materials from the surface-modified finish of a glass container so as to obtain reliable adhesion to a thermoplastic closure.

DETAILED DESCRIPTION OF THE INVENTION

The invention comprises the preparation of a glass container for use with a seal comprising a membrane closure as an alternative to the conventional innerseal for glass containers. A membrane comprising a thermoplastic polymer is heat sealed to the sealing surface of the glass container. Heat sealing may be accomplished by pressing the membrane to the glass at a temperature near or above the softening point of the thermoplastic but below its melting point as by use of a heated platen. The membrane may be covered by a plastic snap-cap prior to or subsequent to sealing. The membrane desirably may be a metal foil-thermoplastic polymer laminate which allows induction heating of the laminate.

Without the use of the treatment described herein, a serious problem with this type of seal is its vulnerability to humidity. Various coatings have been applied to overcome this problem, commonly being metallic oxides. While the latter may provide a seal sufficient for commercial purposes, its use in combination with a fluoride or sulfate treatment is generally preferred.

Treating glass surfaces with sulfur oxides or decomposable fluorine compounds and treatment with sulfur and fluorine compounds are well known. These are shown, for example, in U.S. Pat. No. 3,249,246.

However, the use of these methods for improving the stability of a polymer/glass bond in the presence of water vapor, enabling the employment of a thermoplastic membrane seal for glass containers has not been shown. The further treatment of the sealing surface to supply a metal oxide coating before or after the fluorine or sulfur oxide treatment results in a further improvement in glass/polymer bond stability. Furthermore, it has not been previously recognized that contamination of the so-treated finish of a glass container by contact therewith by conventional cold end lubricity enhancing agents would interfere with the integrity of a polymer-glass seal. It is to be noted that conventional sealing closures are normally unaffected by the presence of small amounts of lubricity enhancing agents on the container finsih, large amounts cause cap backoff problems, that is the screw cap loosens on the shelf.

Figure 1:
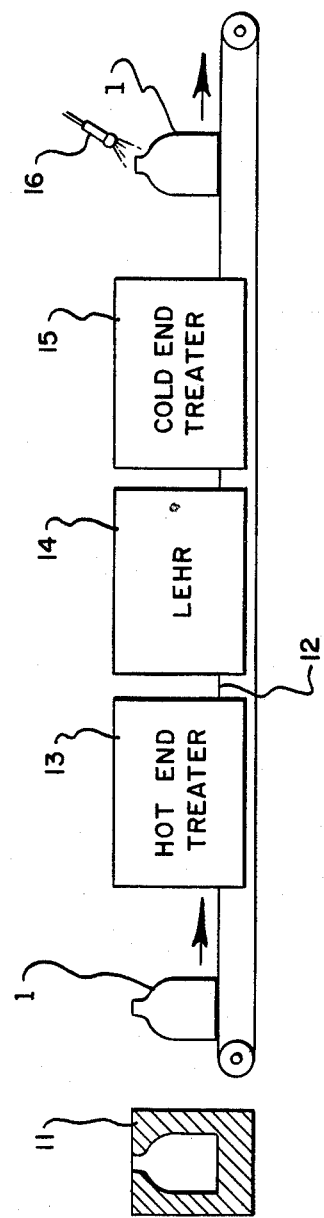
FIG. 1 is a diagrammatic flow sheet showing the steps to prepare a glass container for use in this invention.

Referring now to FIG. 1 there is shown the sequential steps required for preparing a glass container for use in this invention. A glass container or jar 1 is formed in the mold 11 of a forming machine at a high temperature, normally in the range 1000°–2000° F., as is conventional. The containers 1 are carried on conveyor 12 to the hot end treater 13 wherein the container finish is subjected to a chemical treatment which renders the finish surface durably bondable to a thermoplastic membrane.

Although the containers 1 are conveyed immediately from the forming mold 11 to the hot end treater 13, they have cooled considerably at this point and display a temperature generally in the range of about 800 degrees to about 1200 degrees F. Sometimes the bottles cool to a point where they need to be reheated to the 800° to 1200° F. range by burners placed between the forming machine and the hot end treatment equipment. While at this temperature, the sealing surface or finish of the containers is contacted with a material or materials which act upon and modify the surface properties of the glass. These materials include generally certain fluorine containing compounds, sulfur oxides and metal compounds which decompose to form metal oxides at the treatment temperatures.

The fluorine compounds comprise generally those which decompose upon heating to treatment temperatures, i.e., from 800 degrees to about 1200 degrees F., and include specifically the alkyl fluorides as, for example, 1,1-difluoroethane; ammonium fluorides including $NH_4F$ and $NH_4HF$; metal fluorides such as $SnF_4$, $BF_3$, $AlF_3$, and the like; and metallo-organic fluorides such as $NH_4SnF_3$ and $(CH_3)_2 SnF_2$. Sulfur compounds useful in this invention include sulfur dioxide, sulfur trioxide and sulfur compounds which decompose to sulfur oxides at treatment temperatures. Metal compounds employed are those which thermally decompose to form metal oxides and preferably comprise tin or titanium chlorides.

Hot end treatment is accomplished by impinging the treating material, either as a liquid or gas stream, upon the finish surface. Alternatively, the treating material may be fed as a gas, along with a fuel such as natural gas, to a burner and the burner flame directed to play on the finish surface. Treatment time required is short, on the order of a few seconds, but extended treatment times do not detract from results obtained.

One preferred hot end treatment comprises contacting the finish surface with both a fluorine containing compound and a metal oxide precursor such as tin tetrachloride. The order of contact makes no significant difference in the results obtained with either the fluoride compound on the metal oxide precursor being applied first. The two treating materials may also be simultaneously applied.

After hot end treatment is complete, the containers are passed through lehr 14, which may be of the tunnel type, where they are annealed. Containers exit from the lehr at a relatively cool temperature, on the order of 100 degrees to 300 degrees F., and are next passed to cold end treater 15. In treater 15, the exterior surfaces of the containers are given a thin coating of a conventional lubricity enhancing material which typically may be a polymer, a stearate, a silicone compound or the like. The purpose of the cold end treatment is to increase resistance of the containers to damage due to abrasion or scratching and to increase their resistance to failure during the high speed handling of the containers during subsequent filling, capping, labelling and packaging operations.

During cold end treatment, some of the treating material deposits on the surface of the container finish despite efforts made to avoid that result. Presence of small amounts of lubricity enhancing agents on the finish surface does not interfere with the seal integrity of ordinary closures of the screw type and the like. However, these lubricity enhancing agents do tend to interfere with the bonding or adhesion of a thermoplastic membrane to the glass surface and do in fact cause an unacceptable rate of seal failure.

In this invention, containers which have been subjected to a cold end treatment which leaves at least a residue of lubricity enhancing agent on the finish surface are further treated to remove that agent from the finish without affecting the thermoplastic-glass bonding properties imparted by the hot end treatment. This is accomplished by briefly exposing the container finish to an intense, directed heat source 16. The heat source may be a gas burner, a laser or any other narrowly directed but intense source of heat. Exposure time is ordinarily less than five seconds and typically is on the order of one to three seconds. In all cases, surface temperature of the finish must not reach flame polishing temperatures else the effect of the hot end treatment is destroyed. It is also important to avoid heating of the container side walls as that would destroy the effect of the cold end treatment on those surfaces. Surface temperature of the finish immediately after exposure to heat source 16 typically is on the order of 250 degrees to 350 degrees F. but it is postulated that higher surface temperatures have been reached during the exposure to the heat source.

In one preferred embodiment, heat source 16 is directed at the container finish from above at about a 45 degree angle as is shown in the drawing. The container is then rotated to expose equally all of the finish surface to the heat source.

Figure 2:
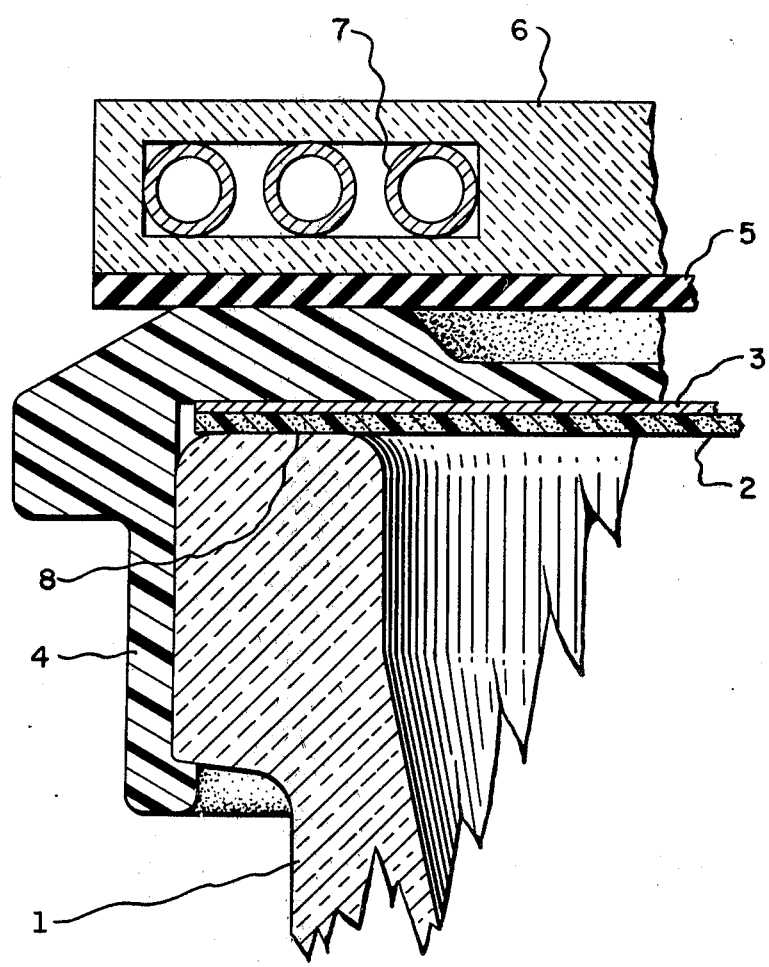
FIG. 2 is a partial view—in section of the upper portion of a glass container showing the mode of attaching a metal foil-thermoplastic film membrane to the container sealing surface.

After treatment of the finish surface is complete and the surface has cooled, as shown in FIG. 2, a laminate of aluminum foil 3 and thermoplastic film 2 is placed on the rim of jar 1 with the thermoplastic film 2 contacting the glass rim, a plastic snap cover 4 is placed over the jar mouth as shown, to force the laminate in contact with the rim. A resilient pad 5, is placed over the snap cover and a water-cooled induction heating coil 7, in a chuck or holder 6 of insulating material is placed over pad 5. Thereafter high frequency alternating current is passed through the induction coil to heat aluminum foil 3 and cause the thermoplastic film 2 to bond to the glass rim along sealing surface 8.

The following examples set out specific embodiments which serve to more fully illustrate and explain the invention.

EXAMPLE 1

Six-ounce capacity round glass jars were sealed without treatment of the sealing surface. The jars were sealed with a Surlyn laminated foil using a platen heated to 350 degrees F. at a pressure of 200 psi. Dwell time of the heated platen on each jar was 30 seconds. Thereafter, the sealed jars were tested for seal durability.

Three different tests were used for determining seal durability. The first test, designated Test No. 1, consisted of sealing jars with small amounts of water inside and thereafter placing the sealed jars in a humidity cabinet maintained at a temperature of 100 degrees F. and a relative humidity of 85%. Test No. 2 consisted of sealing empty jars and thereafter placing them in a humidity cabinet maintained at the same conditions as Test No. 1. The third test, or Test No. 3, consisted of sealing jars containing water and thereafter allowing the jars to remain at ambient temperature and humidity. All tests were considered complete after 28 days.

Six jars sealed as previously described were subjected to each of Test Nos. 1-3. Results of the tests are set out in the following table:

TABLE I

|  | Days to Failure | % of Samples that Failed | % Still Sealed Over 28 Days |
|---|---|---|---|
| Test No. 1 | 1 | 100% | 0% |
| Test No. 2 | 1 | 67% | |
|  | 2 | 100% | 0% |
| Test No. 3 | 1 | 67% | 0% |
|  | 2 | 100% | 0% |

EXAMPLE 2

A glass jar of conventional soda-lime-silica composition was preheated in a furnace to 800-1200 degrees F. and then rotated under a ribbon burner, the burner flame playing on the rim of the jar for 1 to 10 seconds. The flame consisted of natural gas - air - 1,1-difluoroethane (DFE), the latter furnishing the fluorine. Thereafter, tin tetrachloride vapors were blown against the rim of the jar for a like period of time while still rotating. Thereafter, the jar was cooled and sealed as described in Example 1.

The bond was found to be impervious to 85 percent relative humidity at 100 degrees F. and to direct water contact.

EXAMPLE 3

Ten baby food jars were preheated in an oven to 500 degrees C. (932° F.) Each jar was rotated under a ribbon burner for 30 seconds. The flame consisted of natural gas - air - 1,1-difluoroethane (DFE), the latter furnishing the fluorine. The flow of DFE to the burner was 1.0 scfh. After cooling, the jars were sealed with various aluminum foil/polymer laminates. The platen heater temperature was 300 degrees F., the pressure on the jar rim was 290 psi, and the dwell time on the jar was 15 seconds. The jars were sealed with water inside and allowed to remain in ambient relative humidity as described in Test No. 3 of Example 1.

The following table gives the result of the above tests.

TABLE II

|  | Days to Failure | % of Samples that Failed | % Still Sealed Over 28 Days |
|---|---|---|---|
| Test No. 3 | 7 | 30% | |
|  | 9 | 50% | |
|  | 12 | 60% | |
|  | 27 | 80% | 20% |

EXAMPLE 4

Nine three-ounce tea jars of conventional soda-lime-silica composition were fluorine treated in the manner described in Example 3, except that the DFE flow was 20 scfh and time under burners was 15 seconds. While the jar was still hot, tin tetrachloride vapors were blown against the rim of the jar for approximately 5 seconds, while still rotating. The platen heater temperature was 350 degrees F., heater pressure 245 psi, dwell time 30 seconds. The sealed jars were then tested by the procedure of Test No. 3 of example 1.

The following table shows the results of this test:

TABLE III

|  | Days to Failure | % of Samples that Failed | % Still Sealed Over 28 Days |
|---|---|---|---|
| Test No. 3 | N/A | 0% | 100% |

As is evident from the data presented in Examples 1-4, treatment of the glass sealing surface with fluorine only resulted in significantly better seal durability than was obtainable with untreated glass surfaces. A combination treatment using first fluorine and then a metal oxide, as in Examples 2 and 4, produced seals which did not fail under the test conditions.

EXAMPLE 5

Conventionally formed glass containers were subjected to a hot end chemical treatment in accordance with the procedure illustrated by FIG. 1 in which the container finish was modified to produce a greater adhesion to thermoplastic membranes. The so-treated containers were than annealed and after annealing were coated by spraying with a lubricity enhancing agent.

A lot of the so-formed containers was used to package and seal a food stuff with an aluminum-thermoplastic laminate closure in accordance with the teachings of this invention. Monitoring of the seal integrity of the individual containers over a period of time showed occasional seal failures. When such failures occurred the failure usually occurred in about one week. The seals which did not fail were monitored for periods of months. Careful examination of the containers whose seals had failed traced the cause to contamination of the finish surface with the lubricity enhancing agent.

A second lot of containers was prepared as before except that, after the cold end treatment, the finish of each container was rotated beneath a gas flame directed at the finish surface from above and at a 45 degree angle to the vertical axis of the container for a time period of less than about three seconds. These containers were used to package and seal a food stuff in the identical manner as before. Again, the seal integrity of the individual containers was monitored over a period of time and no seal failures were observed.

The improved jar top closure of the present invention has significant advantages over the conventional closures now employed, e.g., the glassine-metal cap closure. Thus, jars containing dry food products sealed according to this invention have a significantly greater shelf life. Since the membrane seal must be broken to remove the contents, the container is tamper evident. The snap-cap and foil plastic seal system is economical and results in considerable savings over conventional sealing systems. Since the sealing membrane is flexible and is in adhesive contact with the container at its rim portion, the container opening may have a large number of shapes. For example, it may be oval, square, have a pour spout, etc.

Elimination of the necessity for screw threads enables the use of containers having more aesthetic designs, which can be employed for other purposes such as vases, etc. after they are emptied. The membrane closure eliminates any torque problems due to the sticking of a screw cap, and avoids rusting and corrosion difficulties.

We claim:

1. A method for preparing the finish of a glass container including side walls for use with a thermoplastic membrane closure comprising:

subjecting the container finish while hot after forming and before annealing to a chemical treatment which renders the finish surface adherable to a thermoplastic membrane;

annealing said container;

subjecting the annealed container to a cold end treatment wherein the exterior container including the side walls is coated with a lubricity enhancing agent, and removing said lubricity enhancing agent from the finish surface by briefly exposing said surface to an intense heat source and heating it to below flame polishing temperature while avoiding the destruction by heat of the effect of the cold end treatment on the side walls.

2. The method of claim 1 wherein the finish surface is briefly exposed to an intense heat source utilizing the rotation of the container beneath a gas burner for a time of less than about five seconds.

3. The method of claim 2 wherein said chemical treatment comprises contacting said container finish with a fluorine compound decomposable at the container temperature.

4. The method of claim 3 wherein said chemical treatment includes contacting said container finish with a metal oxide precursor which decomposes to form a metal oxide at the container temperature.

5. The method of claim 4 wherein said metal oxide precursor is selected from the group consisting of titanium chlorides, tin chlorides and mixtures thereof.

6. The method of claim 2 wherein said chemical treatment comprises contacting said container finish with a decomposable chemical agent selected from the group consisting of alkyl fluorides, ammonium fluorides, $SnF_4$, $BF_3$, $AlF_3$, $NH_4SnF_3$, $(CH_3)_2 SnF_2$ and mixtures thereof.

7. The method of claim 2 wherein said container finish is at a temperature ranging from about 800 degrees to about 1200 degrees F. while undergoing chemical treatment.

8. The method of claim 7 wherein said glass is a soda-lime-silica glass.

9. A method for sealing an opening in a glass container having side walls comprising:

providing a rim-like sealing surface around said opening;

treating said sealing surface at a high temperature with a chemical agent which renders said surface adherable to a thermoplastic membrane;

coating the exterior surface of said container including said side walls with a lubricity enhancing agent;

removing said lubricity enhancing agent from only said sealing surface by briefly exposing said surface to an intense heat source and heating it to below flame polishing temperature while avoiding destruction by heat of the effect of the cold end treatment on the side walls;

pressing a membrane comprising a thermoplastic material against said sealing surface at a temperature above the softening point but below the melting point of said thermoplastic.

10. The method of claim 9 wherein said chemical agent is selected from the group consisting of alkyl fluorides, ammonium fluorides, tin halides, titanium halides, $BF_3$, $AlF_3$, $NH_4SnF_3$, $(CH_3)_2 SnF_2$ and mixtures thereof.

11. The method of claim 9 wherein said container is annealed after treatment with said chemical agent but before coating the exterior surface thereof with a lubricity enhancing agent.

12. The method of claim 9 wherein the lubricity enhancing agent is removed from said sealing surface by rotating said surface beneath a gas burner for a time not exceeding five seconds.

13. The method of claim 9 wherein said membrane comprises a thermoplastic film adhesively joined on one face to a metal foil.

14. The method of claim 9 wherein said glass is a soda-lime-silica glass.

* * * * *